(12) United States Patent
Eshel et al.

(10) Patent No.: US 11,591,192 B2
(45) Date of Patent: Feb. 28, 2023

(54) ELECTRO MECHANICAL OPERATED BOLLARD

(71) Applicant: ELGOTEAM LTD, Tzoran Kadima (IL)

(72) Inventors: Uri Eshel, Even Yehuda (IL); David Hever, Tel Aviv (IL)

(*) Notice: Subject to any disclaimer, the term of this patent is extended or adjusted under 35 U.S.C. 154(b) by 235 days.

(21) Appl. No.: 17/214,971

(22) Filed: Mar. 29, 2021

(65) Prior Publication Data

US 2022/0306437 A1 Sep. 29, 2022

(51) Int. Cl.
  *F16H 25/22* (2006.01)
  *B66F 3/10* (2006.01)
  *E01F 13/04* (2006.01)

(52) U.S. Cl.
  CPC .............. *B66F 3/10* (2013.01); *E01F 13/046* (2013.01); *F16H 25/2204* (2013.01)

(58) Field of Classification Search
  CPC ....... B66F 3/10; E01F 13/046; F16H 25/2204
  USPC ...................................................... 74/89.29
  See application file for complete search history.

(56) References Cited

U.S. PATENT DOCUMENTS

| | | | | |
|---|---|---|---|---|
| 3,159,046 A | * | 12/1964 | Harned | F16H 25/2204 74/89.29 |
| 4,452,553 A | * | 6/1984 | Kaminsky | B23B 29/034 82/1.4 |
| 4,589,531 A | * | 5/1986 | Washbourn | B60T 13/743 477/22 |
| 4,858,491 A | * | 8/1989 | Shube | B64C 13/341 192/141 |
| 4,962,676 A | * | 10/1990 | Vainstock | B23Q 1/4861 74/490.1 |
| 7,244,075 B2 | | 7/2007 | Stadler | |
| 8,230,750 B2 | * | 7/2012 | Flatt | B64C 13/341 244/99.2 |
| 8,794,865 B2 | | 8/2014 | Stadler | |
| 2007/0031189 A1 | | 2/2007 | Stadler | |
| 2014/0161521 A1 | | 6/2014 | Ball | |
| 2016/0103295 A1 | * | 4/2016 | Zhang | F16H 48/38 74/89.29 |
| 2022/0252111 A1 | * | 8/2022 | Schudy | F16H 9/04 |
| 2022/0306437 A1 | * | 9/2022 | Eshel | F16H 25/2204 |
| 2022/0325764 A1 | * | 10/2022 | Manzanares | F16D 63/006 |

FOREIGN PATENT DOCUMENTS

GB 2372065 A 8/2002

* cited by examiner

*Primary Examiner* — David M Fenstermacher

(57) ABSTRACT

According to an aspect of some embodiments of the present invention there is provided a piston mounted on and fixedly fastened to a ball screw nut, the nut threaded onto a ball screw. By mechanically rotating the piston and preventing the ball screw from rotating, the balls screw nut rotates, thereby raising or lowering the ball screw, thereby raising or lowering the piston, thereby raising or lowering a casing, for example a bollard, mounted on the piston. The casing may be raised or lowered by attaching a handle to the piston and rotating the handle.

20 Claims, 11 Drawing Sheets

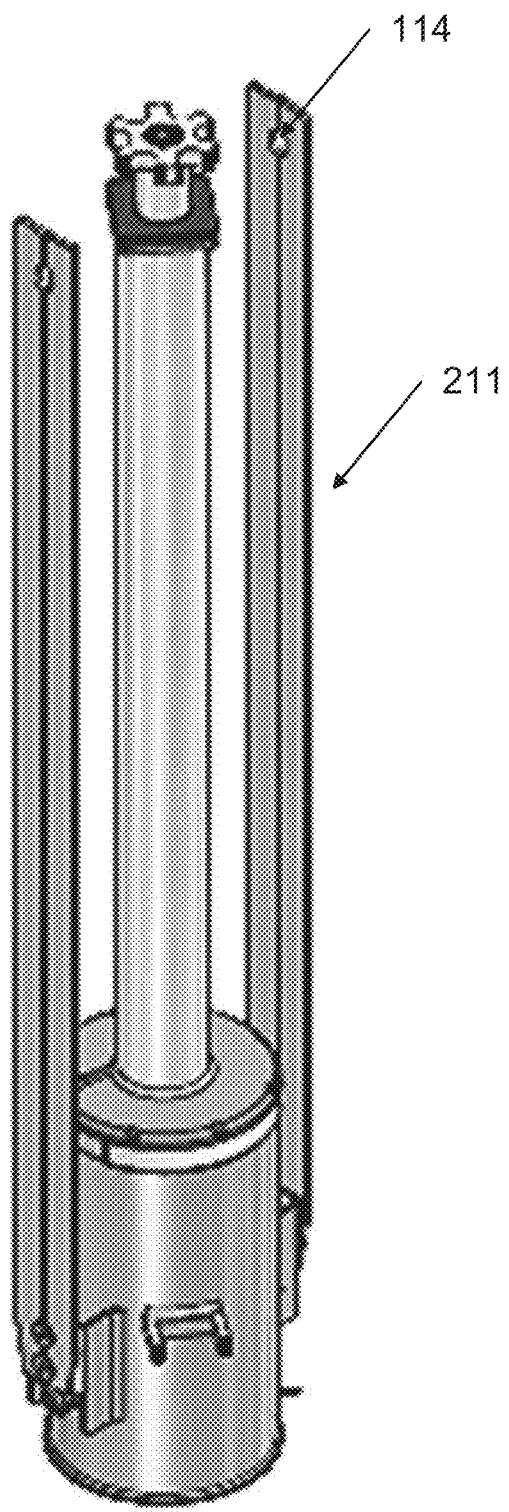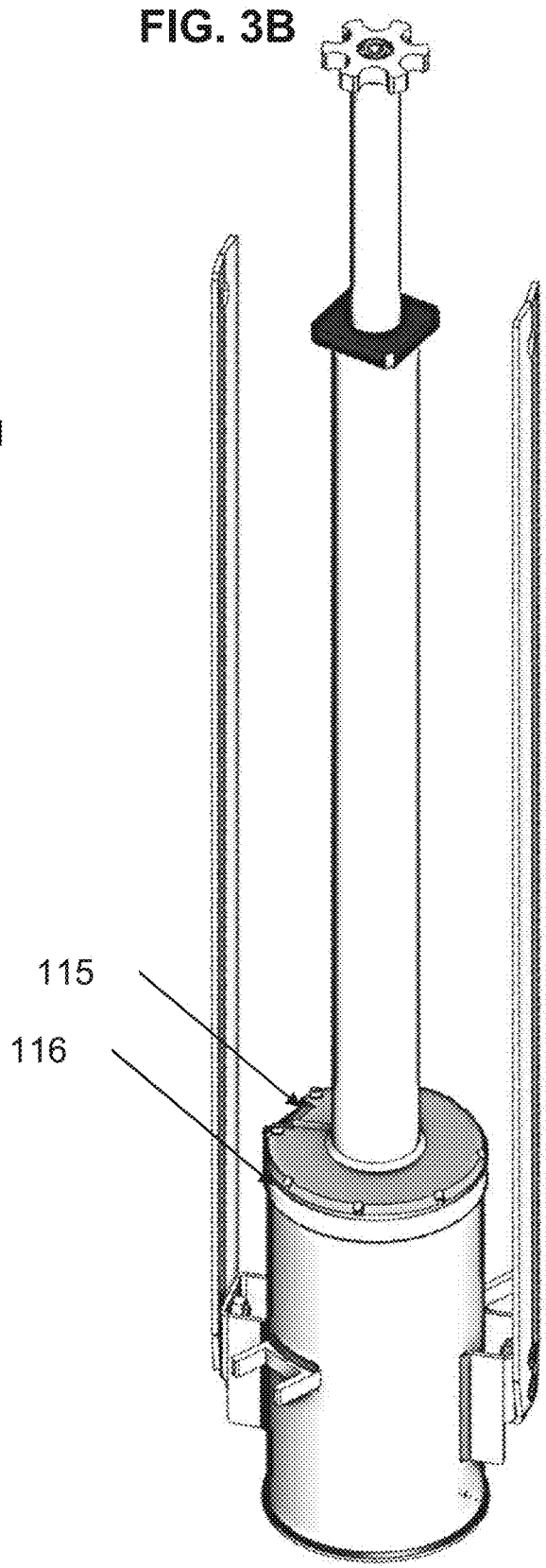

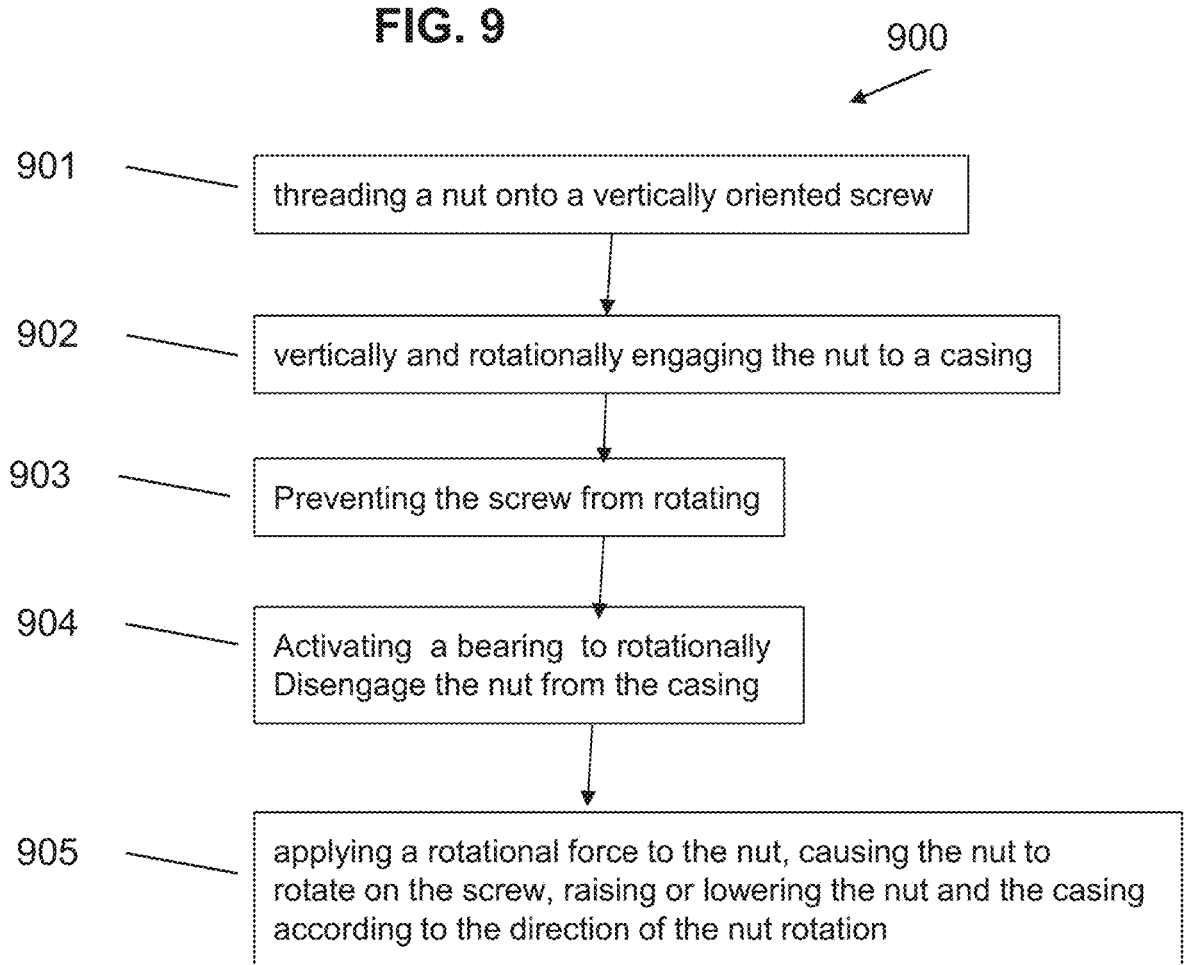

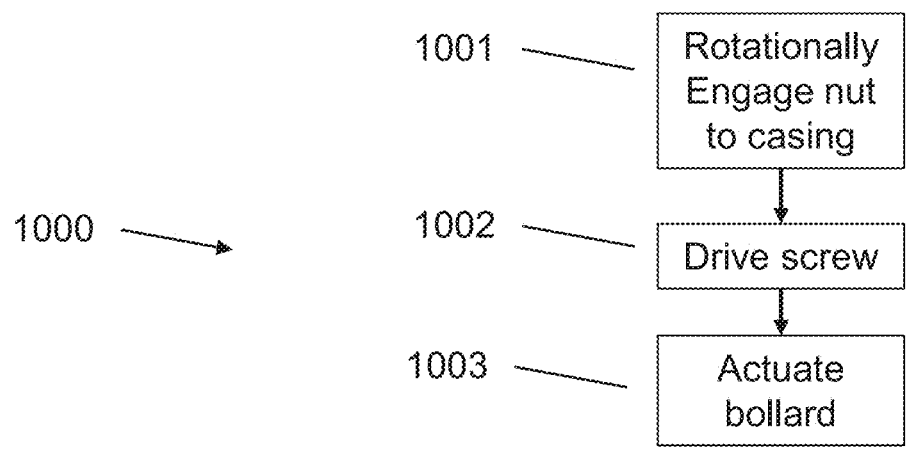
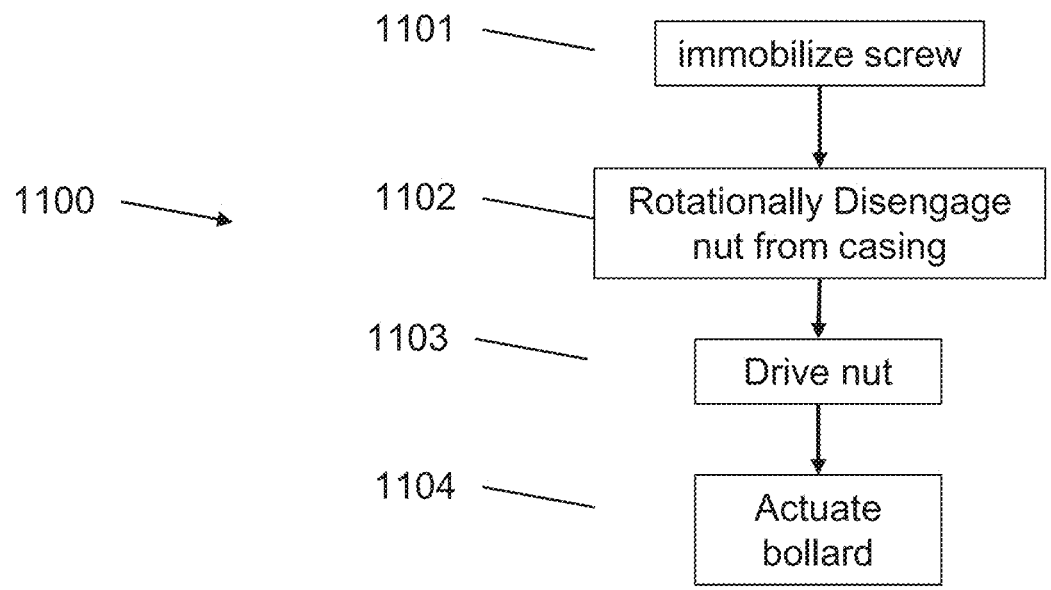

ELECTRO MECHANICAL OPERATED BOLLARD

FIELD AND BACKGROUND OF THE INVENTION

The present invention, in some embodiments, thereof, relates to an actuator for raising and lowering an object and, more particularly, but not exclusively, to a hand powered mechanism for raising and lowering a bollard.

U.S. Pat. No. 8,794,865 appears to disclose, "A telescoping bollard assembly is provided. The bollard assembly includes a threaded shaft and a shaft housing structure containing a lubricant source in fluid communication with the shaft threads. A lubricant is positioned in the lubricant source in contact with the threaded portion of the shaft. A funnel portion is in fluid communication with the lubricant source, and a shaft guide portion is in fluid communication with the funnel portion. A portion of the shaft projects to an exterior of the housing through a shaft exit portion. The shaft exit portion is in fluid communication with the shaft guide portion and defines a flow path for the lubricant to the lubricant source. Rotation of the shaft urges lubricant from the lubricant source sequentially into the funnel portion, the shaft guide portion, and the shaft exit portion, whereby the lubricant is returned to the lubricant source."

U.S. Pat. No. 7,244,075 appears to disclose "a bollard assembly 1 containing an elongated housing 4. A bollard 2 is spaced radially inward of the housing 4 and is axially displaceable therein. A threaded drive shaft receiver 32 is centrally fixed within the housing 4 for threaded reception of a threaded drive shaft 30. The threaded drive shaft 30 is thereby suspended within the housing 4 and threadedly received by the receiver 32. Upon activation of the drive shaft 30 operably connected to the bollard 2, rotation of the drive shaft 30 establishes simultaneous vertical displacement of the drive shaft 30 and the bollard 2."

U.S. Pat. No. 9,133,589 appears to disclose, "A bollard apparatus comprising an outer bollard member (3) comprising a bore, an inner bollard member (5) at least a part of which is located within said bore and is moveable along the bore from a retracted state in which at least some of the inner bollard member is located within the bore to an extended state in which less of the inner bollard member is located within the bore. At least one urging member (19) is arranged to exert an urging force upon the inner bollard member to urge the inner bollard member towards the extended state. A lifting apparatus (12) is coupled to the inner bollard member and operable to exert a lifting force thereupon sufficient to lift the inner bollard to the extended state when also subject to the urging force."

British Patent Application no. GB2372065 appears to disclose, "The security post, for use in car parks, town centers etc., comprises a tubular post 1 accommodated in a close fitting sleeve 2 for movement between a first extended position and a second retracted position, where it is located within the sleeve which itself is located below ground level. The sleeve is fixed to a base plate 3 to which a flanged tube 4 is also secured and to which, in turn, a nut element 6 is secured. A leadscrew 5 extends vertically through the nut and is rotatably secured to the post via a bearing assembly. The leadscrew is formed from a twisted bar with a cornered cross-section and the leadscrew and nut mechanism is designed so that it is non-self-sustaining, with the margin by which the mating threads exceed the minimum criteria for being self-sustaining being at least 50%. The post may be locked in the raised position by a lock pin that engages an end plate fixed to the end of the leadscrew, with the release of the lock pin allowing the post to fall to its retracted position under the effect of gravity."

SUMMARY OF THE INVENTION

BRIEF DESCRIPTION OF THE SEVERAL VIEWS OF THE DRAWING(S)

Some embodiments of the invention are herein described, by way of example only, with reference to the accompanying drawings and/or images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3A is a schematic illustration of a side view of a mechanical actuator, in accordance with an embodiment of the current invention;

FIG. 3B is a schematic illustration of a side view of a mechanical actuator, in accordance with an embodiment of the current invention;

FIG. 9 is a flow chart illustration of a method of using a mechanical actuator in accordance with an embodiment of the current invention;

FIG. 10A is a flow chart illustration of a method of using a mechanical actuator in accordance with an embodiment of the current invention; and FIG. 10B is a flow chart illustration of a method of using a mechanical actuator in accordance with an embodiment of the current invention.

DESCRIPTION OF SPECIFIC EMBODIMENTS OF THE INVENTION

Figure 1A:
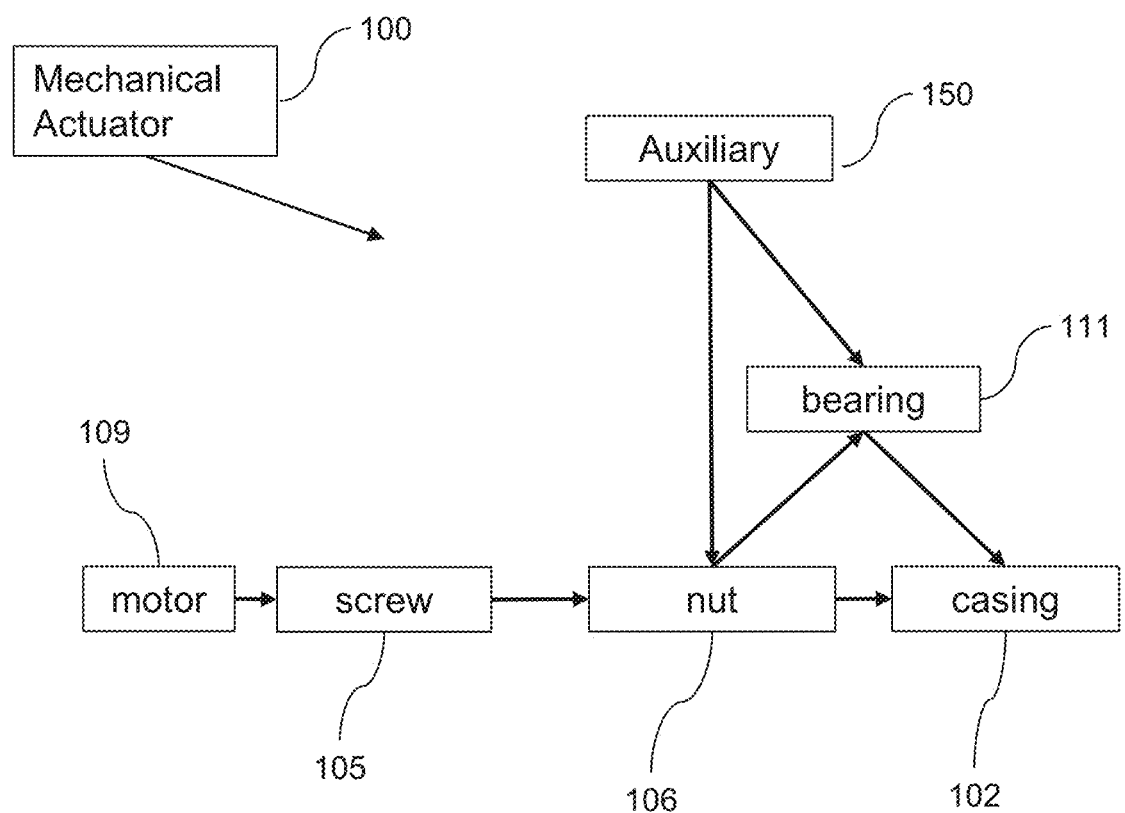
FIG. 1A is a block diagram of a mechanical actuator, in accordance with an embodiment of the current invention.

The present invention, in some embodiments, thereof, relates to an actuator for raising and lowering an object and, more particularly, but not exclusively, to a hand powered mechanism for raising and lowering a bollard.

Overview

An aspect of some embodiments of the current invention relates to a mechanical actuator for a bollard including a mechanically actuated screw, for example manually actuated. For example, the screw may include a ball screw. In some embodiments, the mechanical actuator comprises a screw, a screw nut threaded onto the screw, a piston mounted over the screw, and a bearing. In some embodiments, of the invention, the mechanical actuator may comprise a means for rotating a screw nut by rotating a piston attached to the screw nut when the screw is rotationally locked, thereby causing a mounted casing to raise or lower, depending on the direction of the rotation.

In some embodiments, of the invention the piston may rotate freely relative to the screw. In some embodiments, the piston may be vertically and/or rotationally fixed to the screw nut, such that raising/lowering the screw nut causes the piston to be raised/lowered. In some embodiments, an internal surface of a head of the casing may rest on a head of the piston by force of gravity and/or mechanical coupling. Optionally, contact and/or coupling between the piston and the casing may impeded rotation of the piston, Additionally or alternatively, raising or lowering the piston may raise or lower the casing. In some embodiments, the casing may be inhibited from rotating, for example by being fixed with a cement outer casing. In some embodiments, the casing resting on the piston may prevent the piston from rotating. In some embodiments, by disengaging the casing from the piston, the piston may be mechanically rotated while the screw is prevented from rotating, thereby raising/lowering the casing.

In some embodiments, the piston may be fixedly fastened to the screw nut. In some embodiments, by mechanically rotating the piston, the ball screw nut rotates, thereby raising or lowering the piston, thereby raising or lowering the casing. For example, the casing may be raised or lowered by attaching a handle to the piston. For example, the handle may be inserted through the casing and/or rotated. Optionally, inserting and/or rotating the handle facilitates and/or causes rotation of the piston. For example disengaging the piston from the casing may facilitate the piston to rotate freely relative to the casing Where applicable and unless stated otherwise, the terms "rotate", "rotatable" and "axial rotation" refers herein to rotating an object around a vertical, and/or lengthwise (longitudinal) axis of the object. The axis may be a centered axis or an axis offset from the center of the object. The rotation may be either clockwise or counterclockwise.

Where applicable and unless stated otherwise, the term "head" refers herein to an uppermost surface of a vertically elongated object or device. In some cases, the surface may be substantially planar and/or substantially perpendicular to the longitudinal axis of the object.

Where applicable and unless stated otherwise, the term "piston" refers to a form of covering of a screw.

In some embodiments, a mechanical actuator comprises a casing mounted over a screw. The terms "casing" and/or "outer casing" as used herein may refer, for example, to a bollard and/or to any other object that may be raised and/or lowered by a screw and screw nut.

Electric Power System and Locking Mechanism

In some embodiments, the mechanical actuator may be attached to an electric power system that while operating may turn a screw. For example, the electrical power system may include an electric motor. In some embodiments, the mechanical actuator may comprise a brake to lock the screw from rotating when the electric power system is not operating, for example during a power outage and/or a malfunction of the electric power system. The locking mechanism may prevent the gravitational force of the casing mounted on the mechanical actuator from indirectly causing the screw to rotate when the electric power system is not operating, thereby unintentionally lowering the casing.

Bearing for Disengaging Piston and Casing

In some embodiments, a bearing may be attached to a piston head and/or a conduit in the casing of the mechanical actuator. In some embodiments, the bearing distal end may protrude within the casing and/or resting on the piston head. In some embodiments, the bearing may comprise a rotating mechanism allowing the distal portion pressing against the piston to rotate together with the piston relative to a proximal portion connected to the casing head. In some embodiments, the bearing may comprise a hollow channel for attaching a handle from outside the casing. For example, the handle may attach directly to the piston head and/or rotating the handle may cause the piston to rotate. In some embodiments, rotating the handle in one direction may raise the casing, and rotating the handle in an opposite direction may lower the casing Thermal Management In some embodiments, the mechanical actuator may comprise a thermal management system for the electric motor, for example a heat sink, fins, and/or any other form of thermal management.

Electric Motor Duty Cycle

According to some embodiments of the invention, the mechanical actuator may comprise an electric motor with a duty cycle of more than 50%, for example a duty cycle may range between 50-52%, 52-54%, 54-56%, 56-58%, 58-60%, 60-62%, 62-64%, 64-66%, 66-68%, 68-70%, 50-55%, 55-60%, 60-65%, 65-70%, and/or greater than 70%.

In some embodiments, the mechanical efficiency of the mechanical actuator and/or the heat management system may allow an electric motor to operate at above 50% duty cycle over long periods of time without malfunction.

Waterproof Enclosure

According to some embodiments of the invention, the mechanical actuator may comprise water tight seals preventing the electric motor and/or screw mechanism from contact with ambient water and/or particulate, for example when a casing comprising the mechanical actuator is submerged in water. For example, the waterproof enclosure may meet the requirements of a waterproof standard, for example IP68.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1A is a block diagram of a mechanical actuator, in accordance with an embodiment of the current invention. For example, mechanical actuator 100 may include a main driver and/or an auxiliary activator.

In some embodiments, the auxiliary activator may include a driver 150, for example supplying torque to drive the actuator. For example, the driver may comprise a handle (e.g., a crank) and/or a shank. Additionally or alternatively, the auxiliary activator may include a bearing 111. Alternatively or additionally, driver 150 may include a motor.

In some embodiments, nut 106 may be a ball screw nut, and screw 105 may be a ball screw nut. For example, a ball assembly may act as nut 106 when threaded onto screw 105.

In some embodiments, screw 105 is threaded to nut 106. In some embodiments, a motor 109 may rotate screw 105. In some embodiments, nut 106 and/or piston 112 is rotationally coupled with a casing 102. In some embodiments, rotating screw 105 with respect to nut 106 actuates mechanical actuator 100. For example, mechanical actuator 100 may be a linear actuator that raises and/or lowers a bollard. In some embodiments, the casing 102 may be include the bollard; alternatively or additionally, the casing 102 may be separate from the bollard.

In some embodiments, an auxiliary activator is available for activating the mechanical actuator 100. For example, in a case where screw 105 is prevented from rotating, auxiliary activator may be used to activate the mechanical actuator 100 by rotating nut 106 with respect to immobilized screw 105. For example, auxiliary driver 150 may be reversibly connectable (e.g., rotationally engageable) to nut 106. In some embodiments, the connection between auxiliary driver 150 and nut 106 may be indirect, for example via a piston for example as described in later embodiments. Additionally or alternatively, the auxiliary activator may rotationally disengage nut 106 from casing 102, for example by means of bearing 111.

In some embodiments, while the auxiliary driver 150 is attached to nut 106 a portion of auxiliary driver 150 is accessible from outside mechanical actuator 100. For example, if motor 109 fails, the mechanical actuator 100 may be activated by auxiliary driver 150. In some embodiments, mechanical actuator 100 may raise and lower a casing 102 (e.g., the casing 102 may include a bollard).

Figure 1B:
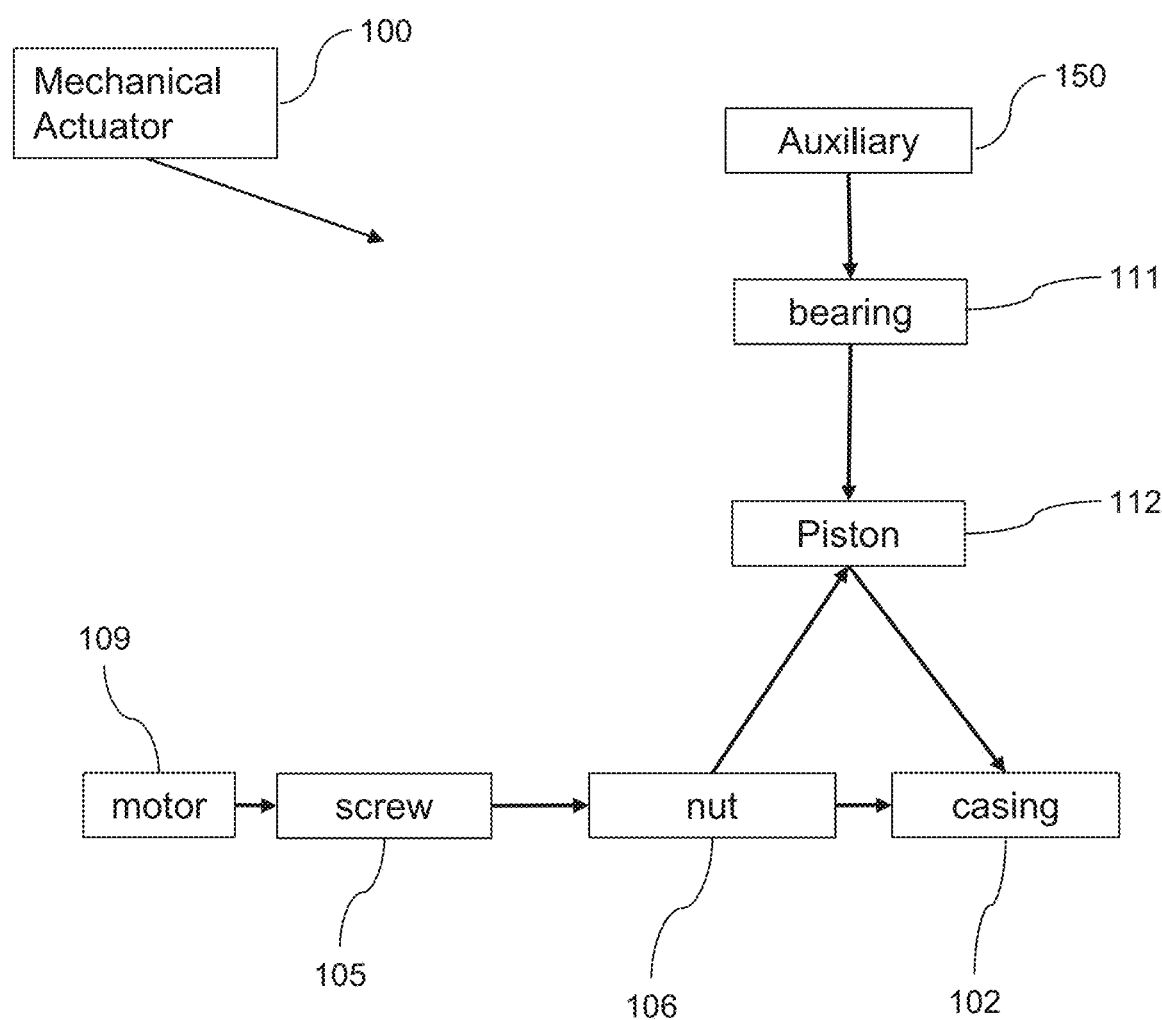
FIG. 1B is a block diagram of a mechanical actuator with an optional piston, in accordance with an embodiment of the current invention.

FIG. 1B is a block diagram of a mechanical actuator with an optional piston, in accordance with an embodiment of the current invention.

In some embodiments of the invention casing 102 may be indirectly engaged with nut 106 by an intermediary component, for example piston 112. Nut 106 may be fixedly engaged with piston 112. An internal downward facing surface of casing 102 may rest on an external upward facing surface of piston 112.

Figure 2A:
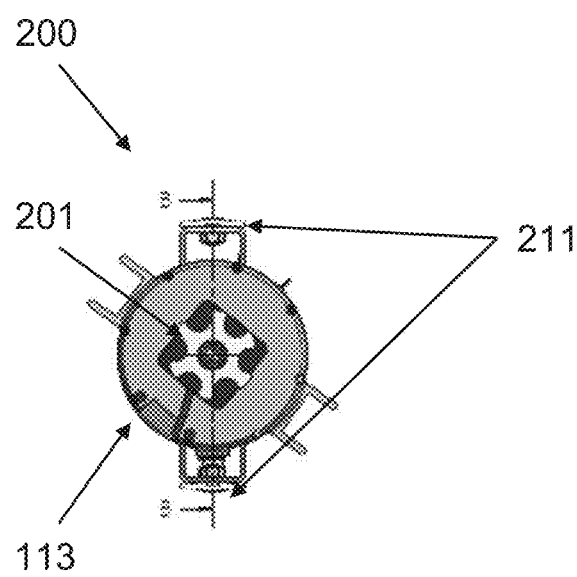
FIG. 2A is a schematic illustration of a side cross-section view of mechanical actuator, in accordance with an embodiment of the current invention.
Figure 2B:
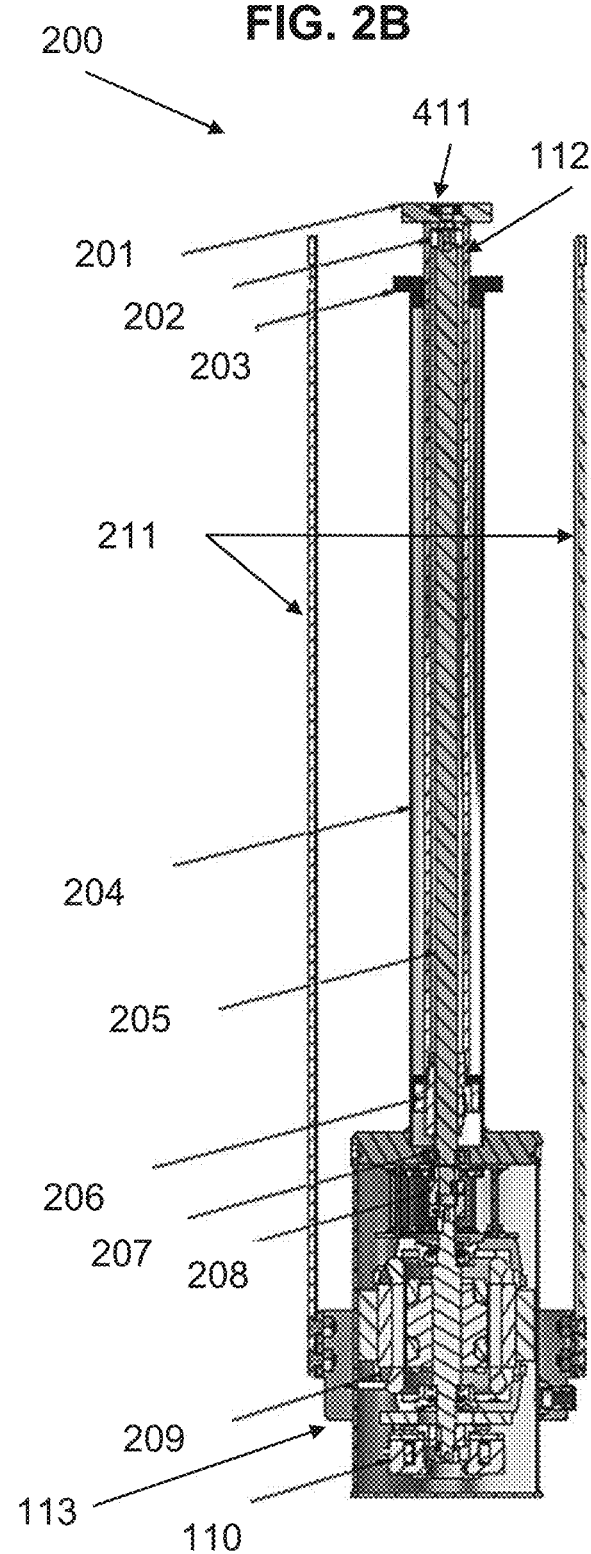
FIG. 2B is a schematic illustration of a top view of mechanical actuator 100, in accordance with an embodiment of the current invention.

FIG. 2A is a schematic illustration of a top view of mechanical actuator 200, in accordance with an embodiment of the current invention. FIG. 2B is a schematic illustration of a side cross-section view of mechanical actuator 200, in accordance with an embodiment of the current invention.

In some embodiments, mechanical actuator 200 may comprise piston head 201, top guide 202, piston gasket head 203, piston outcase 204, screw 205, screw nut 206, bottom bearing 207, coupling 208, motor 209, motor brake 110, anchor bars 211, piston 112, and motor enclosure 113. In some embodiments, piston 112 comprises piston head 201.

In some embodiments, piston head 201 may comprise a mechanical coupling for attaching a handle to piston head 201, for example a male or a female threaded protrusion or recess for screwing a threaded protrusion or recess of a handle onto the piston head 201, a click lock, and/or any other method of reversibly mechanically attaching a handle.

In some embodiments, top guide 202 comprises a guide for screw 205. For example, the guide may facilitate rotating the screw with reduced wobble and/or displacement from a central axis.

In some embodiments, piston gasket head 203 may comprise a gasket that substantially prevents liquids from passing from the outside to the inside of the piston outcase 204, for example a wiper seal, ring seal, a radial seal, an axial seal, a single lip U-seal, a double lip U-seal, an O-ring, U-cup seal, an axial excluder seal, a V-ring, and/or any other type of seal. In some embodiments, the piston is cylindrical, and the piston gasket head comprises a U-seal, for example a U-seal wiper. In some embodiments, piston gasket head 203 may comprise a seal compliant with IP68 ingress protection standard.

In some embodiments, piston outcase 204 comprises an enclosure of piston 112. In some embodiments, piston outcase 204 may be formed from a metal, for example aluminum. In some embodiments, piston outcase 204 may be cylindrical.

In some embodiments, screw nut 206 comprises and/or is attached to a guide to prevent displacement during operation.

In some embodiments, bottom bearing 207 comprises a bearing to allow screw 205 to freely rotate with minimal wobble and/or displacement from a central axis.

In some embodiments, coupling 208 comprises a mechanical coupling between screw 205 and a power output shaft of motor 209. In some embodiments, coupling 208 is composed of a metal, for example aluminum.

In some embodiments, motor 209 comprises a three-phase motor and/or a single phase motor. In some embodiments, motor 209 comprises a power rating ranging between 0.1-0.3 Kw, 0.3-0.5 Kw, 0.5-0.7 Kw, 0.7-0.9 Kw, 0.9-1.1 Kw, 1.1-1.3 Kw, 1.3-1.5 Kw, 1.5-2.0 Kw, 2.0-2.5 Kw, 2.5-3.0 Kw, and/or greater than 3.0 Kw.

In some embodiments, motor 209 operates in the range of 0-500 rpm, 500-1000 rpm, 1000-1500 rpm, 1500-2000 rpm, 2000-2500 rpm, 2500-3000 rpm, 3000-4000 rpm, 4000-5000 rpm, 5000-6000 rpm, 6000-7000 rpm, and or greater than 7000 rpm.

In a preferred embodiment, motor 209 has a power rating of about 0.75 Kw at about 1380 rpm.

In some embodiments, mechanical actuator 200 comprises a mechanism that monitors the number of revolutions in either direction of motor 209, and calculates a stopping point of maximum extension and/or retraction based on the counted revolutions of motor 209, and causes motor 209 to cease rotation when the maximum point is reached.

In some embodiments mechanical actuator 200 comprises a magnetic source and magnetic sensors for calculating a vertical elevation of said casing 402. For example, at least one magnetic body, for example a magnetic ring, may be attached to piston 112 and/or any other component that is vertically fixed relative to nut 106. Magnetic sensors may be located external to piston 112 for detecting a vertical position of the magnetic body. A mechanism for receiving an output from said sensors may calculate a vertical position of piston 112 and/or any other component attached to the magnets. For example, the measured position may calculate a stopping point. For example, the stopping point may be when magnets are detected to be at a predetermined threshold extension and/or retraction. For example, the mechanism may cause motor 209 to cease rotation when the threshold (e.g., maximum and/or minimum) elevation is reached.

In some embodiments, motor 209 is enclosed within a motor enclosure 113.

In some embodiments, motor 209 and/or motor enclosure 113 comprise a thermal management apparatus to remove heat from motor 209 to motor enclosure 113, and from motor enclosure 113 to an external heat recipient. For example, motor 209 and/or motor enclosure 113 may comprise Heat sinks, Cold plate, Convective air cooling, forced air cooling, Heat pipes, Peltier cooling plates, Synthetic jet air cooling, Electrostatic fluid acceleration, and/or any other technology of thermal management.

In some embodiments, motor brake 110 prevents a power output shaft of motor 209 from rotating when electrical power supply is disrupted and/or when a malfunction in motor 209 is detected. In some embodiments, mechanical actuator 200 comprises a mechanism for a user to actuate motor brake 110, and/or another mechanism for a user to actuate rotational locking of screw 205.

Figure 4A:
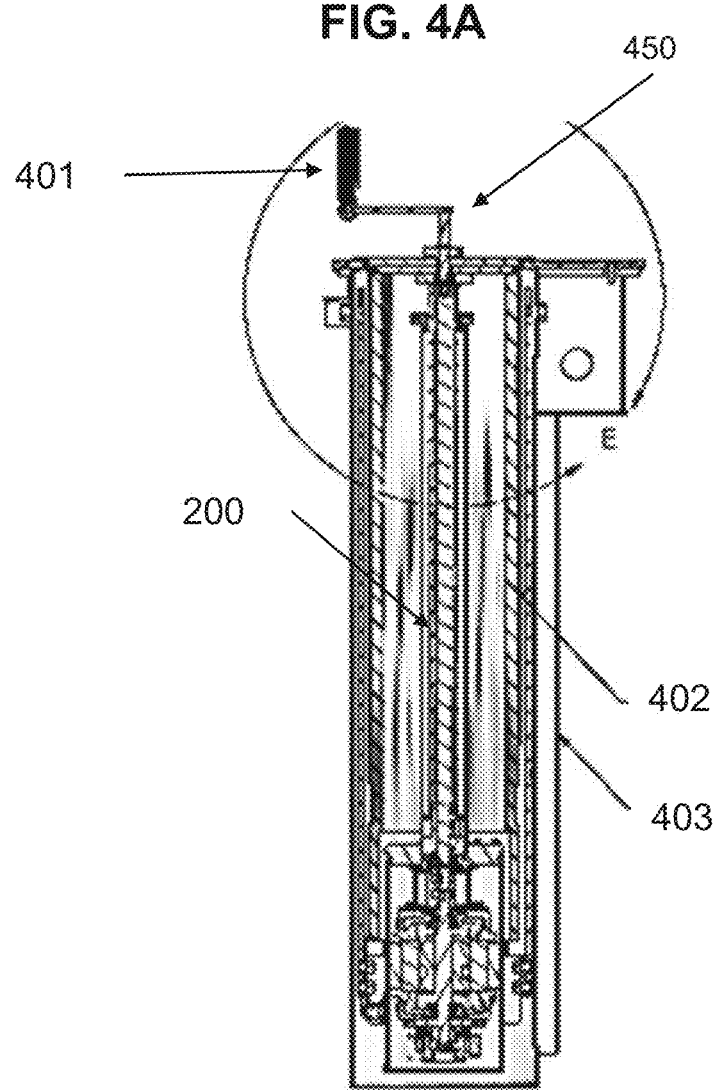
FIG. 4A is a schematic illustration of a cutaway side view of a mechanical actuator, in accordance with an embodiment of the current invention.
Figure 4B:
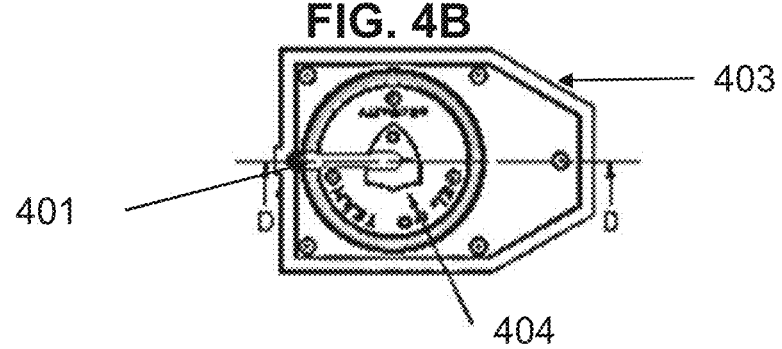
FIG. 4B is a schematic illustration of a top view of a mechanical actuator, in accordance with an embodiment of the current invention.

In some embodiments, anchor bars 211 comprise 1, 2, 3, 4, or more bars that mechanically couple motor 109 to a casing, for example casing 402 and/or outer casing 403 as shown in FIGS. 4A, 4B, thereby preventing mechanical actuator 200 from rotating independent of rotation of the attached casing 402 and/or outer casing 403. In a preferred embodiment, there are two anchor bars 211. In some embodiments, anchor bars 211 may be inserted within a casing, for example within a slot in a thickness of a casing, an exemplary embodiment of casing 402 and/or outer casing 403 is shown in FIG. 4.

In some embodiments, motor enclosure 113 comprises extensions protruding from a substantially cylindrical perimeter for attachment of anchor bars 211.

FIG. 3A is a schematic illustration of a side view of a mechanical actuator, in accordance with an embodiment of the current invention. For example, in FIG. 3A the actuator is shown in a non-extended state.

In some embodiments, anchor bars 211 may be fixed to casing 402 and/or outer casing 403. For example, anchor bars 211 may include an anchor bar hole 114 in an upper region for fastening to casing 402 and/or outer casing 403, for example, as shown in FIGS. 4A and 4B.

FIG. 3B is a schematic illustration of a side view of a mechanical actuator, in accordance with an embodiment of the current invention. In some embodiments, motor enclosure 113 comprises a motor lid 115 and motor lid seal 116. In some embodiments, motor lid seal 116 comprises a fully and/or substantially water tight seal, for example a seal compliant with IP68 ingress protection standard.

FIG. 4A is a schematic illustration of a cutaway side view of a mechanical actuator, in accordance with an embodiment of the current invention.

In some embodiments, mechanical actuator 200 may be encased within casing 402. In some embodiments, casing 402 may be at least partially enclosed by and/or fixedly attached to outer casing 403. In some embodiments, outer casing 403 may be formed from a hard and/or rigid material, for example steel, a metal alloy, a synthetic material, and/or a hardening material, for example concrete.

Figure 5:
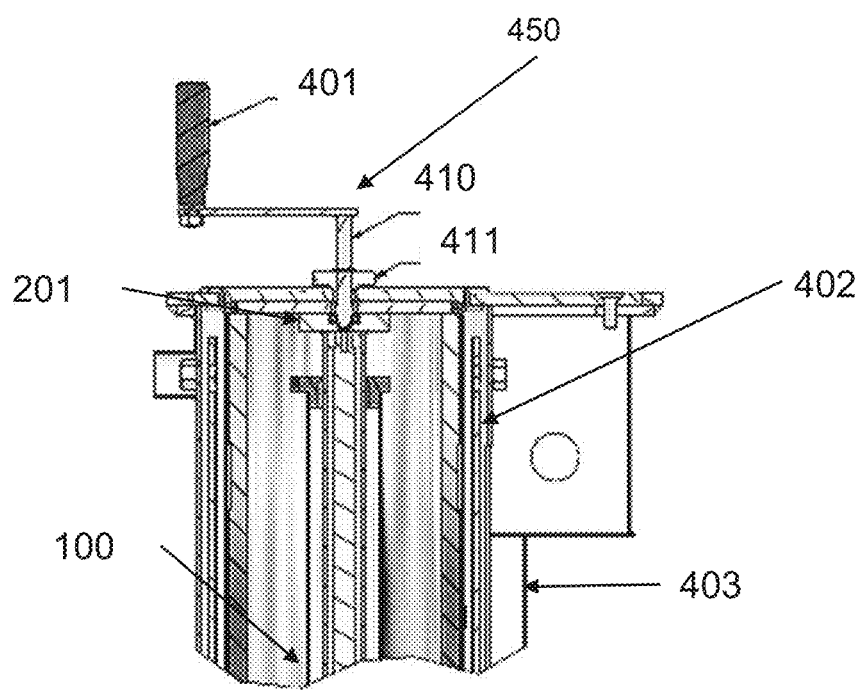
FIG. 5 is a schematic illustration of mechanical actuator with an auxiliary (e.g., a manual handle), in accordance with an embodiment of the current invention.

In some embodiments, handle 401 of auxiliary 450 may be attached to mechanical actuator 200 via a conduit in casing 402, for example, as described in FIG. 5

FIG. 4B is a schematic illustration of a top view of a mechanical actuator, in accordance with an embodiment of the current invention.

In some embodiments, mechanical actuator 200 may be inserted into and/or encased within casing 402, with casing head 404 covering an uppermost portion of mechanical actuator 200.

In some embodiments, casing 402 may be at least partially enclosed by outer casing 403. In some embodiments, outer casing 403 may be formed from concrete.

In some embodiments, handle 401 of auxiliary 450 may be attached to mechanical actuator 200 via a conduit in casing 402, for example, as described in FIG. 5

In some embodiments, casing 402 and/or outer casing 403 may be prevented from rotating, for example by being fixed within ground, concrete, and/or some other non-malleable material.

FIG. 5 is a schematic illustration of mechanical actuator with an auxiliary (e.g., a manual handle), in accordance with an embodiment of the current invention.

In some embodiments, an auxiliary 450 may be included for alternative activating of mechanical actuator 200. For example, the auxiliary 450 may be used to activate mechanical actuator 200 (e.g., to raise or lower a bollard) when a normal functioning of the mechanical actuator 200 fails. For example, mechanical actuator 200 may fail when a mobile part of mechanical actuator 200 becomes locked. In some embodiments, auxiliary 450 facilitates functioning of actuator 200 by mobilizing another previously immobile part of mechanical actuator 200. For example, in normal operation of mechanical actuator 200, motor 209 rotates a mobile component (e.g., screw 205) with respect to a rotatably immobilized component (e.g., nut 206 which in some embodiments is rotatably immobilized by engagement to casing 402). In some embodiments, an auxiliary 450 disengages nut 206 from casing 402 and/or rotates nut 206 with respect to screw 205 to activate the mechanical actuator 200 while screw 205 remains immobile.

In some embodiments, casing head 404 may comprise a hollow conduit, referred to herein as the casing conduit, connecting between the interior surface and exterior surface of casing head 404. In some embodiments, the casing conduit is located at an axial center of mechanical actuator 200. Alternatively or additionally, the casing conduit may be offset from an axial center of mechanical actuator 200.

In some embodiments, prior to inserting auxiliary 450 within casing 402, an interior surface of casing head 404 may be resting on and supported by piston head 201, for example by force of gravity exerted on casing 402.

In some embodiments, when auxiliary 450 is inserted within casing 402 an interior surface of casing head 404 may lifted and/or disengaged from piston head 201.

In some embodiments, bearing 411 may be reversibly attached within the casing conduit. For example, bearing 411 may comprise male thread that may be screwed into corresponding female threads in the casing conduit.

In some embodiments, mechanical actuator 200 may be activated by a torque force supplied from an external source. For example, a mechanism to transfer rotational force to rotate nut 206 when screw 205 is rotationally immobilized may activate mechanical actuator 200.

For example, a mechanism may rotationally disengage piston 112 from casing 402, and allow engaging a torque force from outside casing 402 with piston 112. The external source of torque may be a motor of any variety and/or a hand driven mechanism.

For example, the motor 209 may drive a mobilizing a part of the mechanical actuator 200. For example, when mechanical actuator 200 is being rotatably driven by motor 209, screw nut 206 and/or piston head 201 may be fixed to casing 402. Thus, when motor 209 rotates screw 205 with respect to nut 206, the mechanical actuator 200 raises and/or lowers the piston and/or bollard. In some embodiments, bearing 411 may be of an axial length greater than a thickness of casing head 404, whereby when bearing 411 is attached to piston head 201 and/or casing head 404, a lower distal portion of bearing 411 may protrude into a hollow space within casing 402, thereby disengaging casing head 404 from piston head 201 by lifting casing 402 away from piston head 201.

In some embodiments, bearing 411 may comprise a conduit, referred to herein as the bearing conduit, comprising an end-to-end hollow channel though a length of bearing 411, for example along a central axis of bearing 411.

In some embodiments, the bearing conduit may be of dimensions, shape, and/or geometry to allow handle 401 and/or shank 410 to rotate within the bearing conduit.

In some embodiments, handle 401 may comprise any shape or geometry that may be rotated. In some embodiments, auxiliary 450, handle 401 and/or shank 410 and may require additional tools and/or attachments to rotate.

In some embodiments, a lower distal end of bearing 411 may mechanically couple with piston head 201, for example such that rotation of piston head 201 will cause lower distal portion of bearing 411 to rotate.

In some embodiments, bearing 411 may comprise a rotating mechanism allowing a distal portion pressing against piston head 201 to rotate together with piston 112 relative to a proximal portion of the bolt connected to the casing head 404. In some embodiments, the rotating mechanism may comprise a bearing, for example bearing 411.

In some embodiments, piston head 201 may be fixedly attached nut 206, for example piston head 201 may be fixedly attached to piston 112, and piston 112 may be fixedly attached to screw nut 206.

In some embodiments, rotation of handle 401 of auxiliary 450 may cause rotation of screw nut 206.

In some embodiments, mechanical actuator 200 may comprise a plug that may be attached to the casing head conduit when bearing 411 is not installed in piston head 201 and/or casing head 404, thereby sealing the casing head conduit, for example using a seal and/or gasket compliant with the IP68 ingress protection standard.

Figure 6:
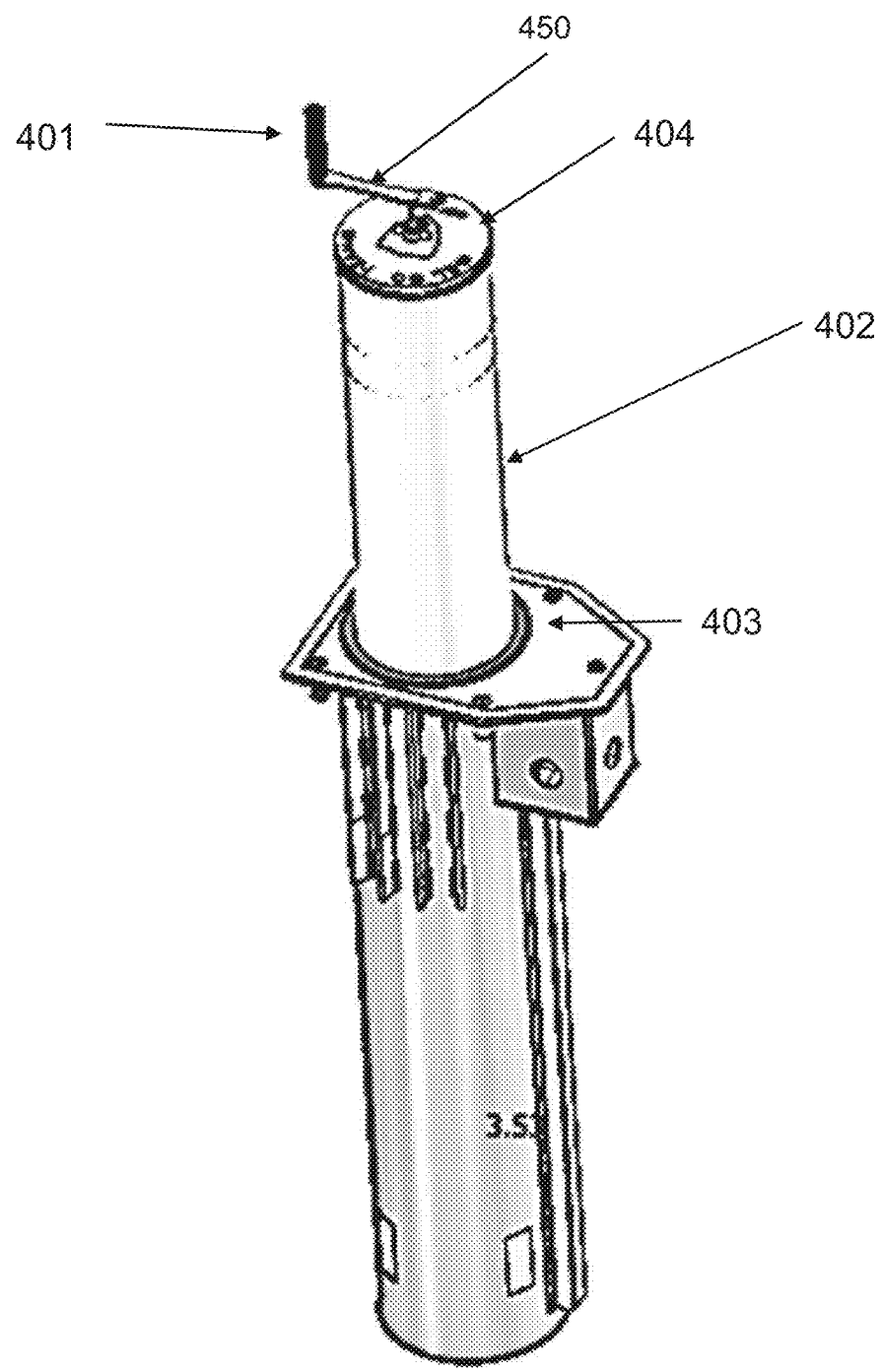
FIG. 6 is a schematic illustration of a side view of a mechanical actuator with a mounted casing and outer casing, in accordance with an embodiment of the current invention.

FIG. 6 is a schematic illustration of a side view of a mechanical actuator with a mounted casing and outer casing, in accordance with an embodiment of the current invention.

Figure 7:
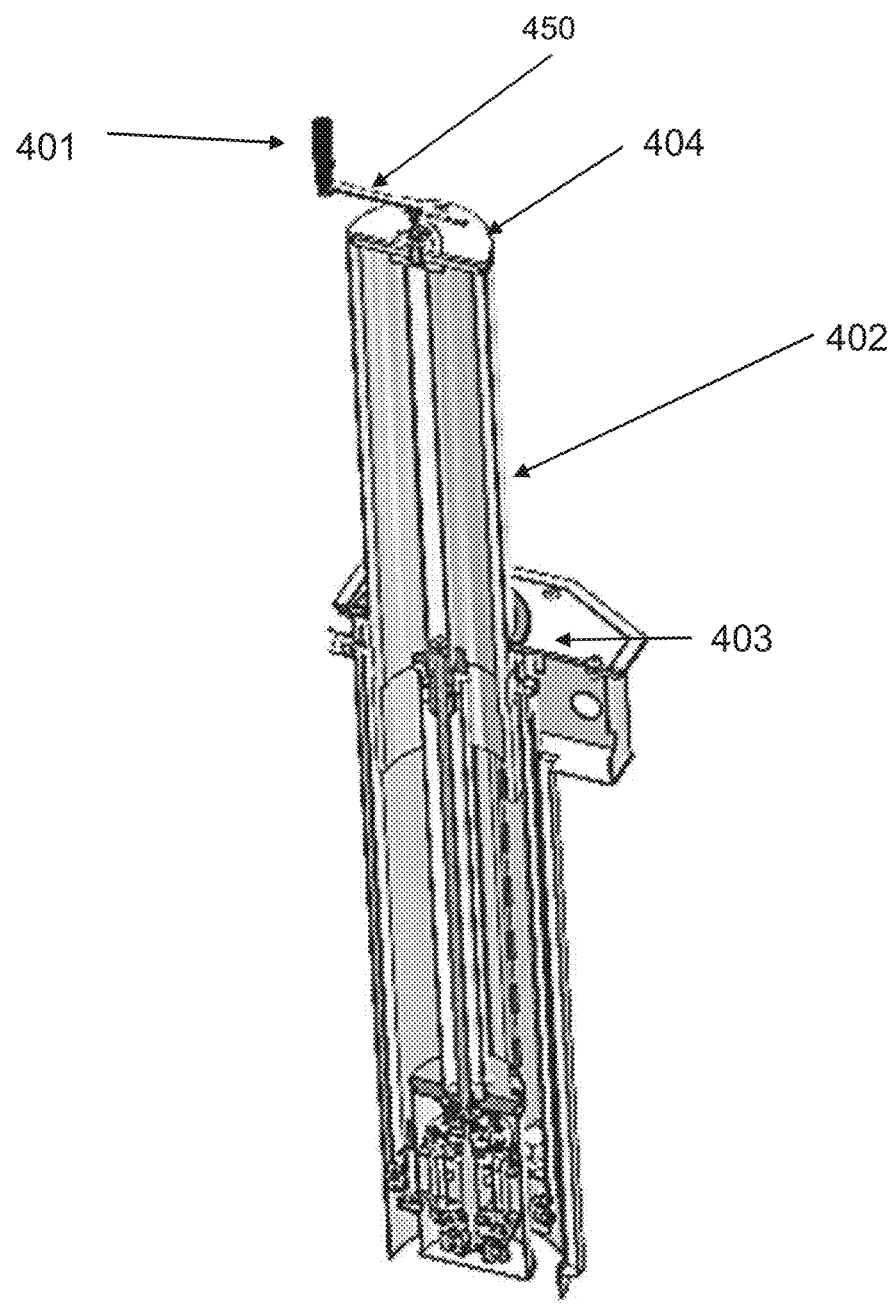
FIG. 7 is a schematic illustration of a cutaway side view of mechanical actuator 100 with a mounted casing and outer casing, in accordance with an embodiment of the current invention.

FIG. 7 is a schematic illustration of a cutaway side view of mechanical actuator 200 with a mounted casing 402 and outer casing 403, in accordance with an embodiment of the current invention.

Figure 8:
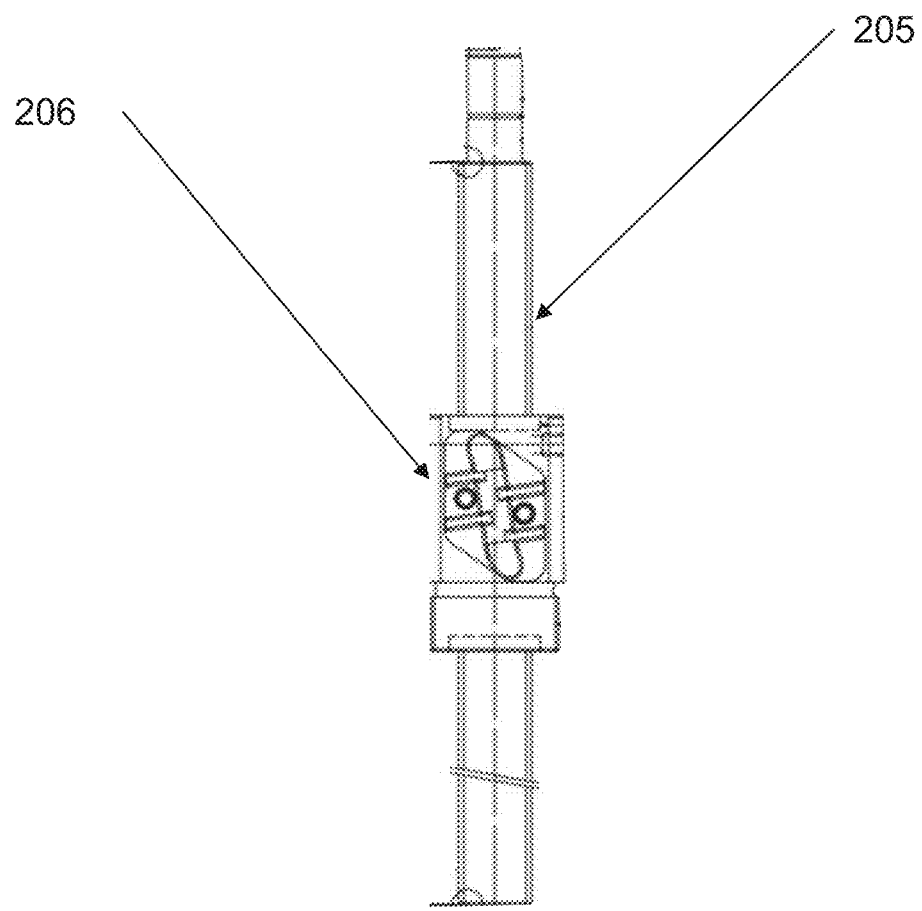
FIG. 8 is a schematic drawing of a screw and screw nut, in accordance with an embodiment of the current invention.

FIG. 8 is a schematic drawing of a screw 205 and screw nut 206, in accordance with an embodiment of the current invention. In some embodiments screw 205 and nut 206 may include a ball screw. In some embodiments, the width and/or diameter of the entire assembly may range between 10 cm to 40 cm and/or between 40 to 80 cm and/or between 5 to 10 cm. In some embodiments, the collapsed length of the system may range between 20 to 75 cm and/or between 75 to 200 cm and/or between 200 to 300 cm. In some embodiments, the extended length of the system may range between 50 to 100 cm and/or between 100 to 300 cm and/or between 300 to 500 cm.

FIG. 9 is a flow chart illustration of a method of using a mechanical actuator in accordance with an embodiment of the current invention.

According to an aspect of some embodiments of the present invention there is provided a method 900 of using a mechanical actuator 200 comprising some or all of the following steps:

901 threading a nut onto a vertically oriented screw.

902 vertically and rotationally engaging the nut to a casing. In some embodiments, the nut is engaged to a casing indirectly via a piston, for example, as described above.

903 preventing the screw from rotating. In some embodiments, the screw may be prevented from rotating by a locking mechanism, for example a locking mechanism on a motor attached to the screw.

904 inserting a bearing into a conduit in the casing, the bearing rotationally disengaging the nut from the casing. In some embodiments, the bearing protrudes between the casing and the piston, for example, as described above.

905 applying a rotational force to the nut, causing the nut to rotate on the screw, thereby raising or lowering the nut and the casing according to the direction of the nut rotation. In some embodiments, the rotational force may be supplied manually via an auxiliary, as described above.

In some embodiments, the order of the steps may be rearranged.

In some embodiments, the nut may be a ball screw nut.

In some embodiments, the casing may be a bollard.

In some embodiments, the screw may be rotationally engaged by a motor, the motor capable of rotating the screw and/or of preventing the screw from rotating.

In some embodiments, the bearing may comprise a conduit for attaching a mechanical device for rotating nut, the mechanical device may be for example a handle and/or a motor.

In some embodiments, the nut may be engaged indirectly to the casing, for example the nut may be fixedly attached to a piston, and the piston may be engaged with the casing.

FIG. 10A is a flow chart illustration of a method of using a mechanical actuator in accordance with an embodiment of the current invention.

According to an aspect of some embodiments of the present invention there is provided a method 1000 of using a mechanical actuator 200 comprising the following steps:

1001 Rotationally engage nut to casing. In some embodiments, the nut may be rotationally and vertically engaged to the casing via an intermediary, for example a piston, as described above. In some embodiments, the casing is prevented from rotating.

1002 Drive screw. In some embodiments, the screw may be driven by a motor as described above.

1003 Actuate Bollard. In some embodiments, the rotation of the screw causes the nut and engaged casing to raise and/or lower as described above.

FIG. 10B is a flow chart illustration of a method of using a mechanical actuator in accordance with an embodiment of the current invention.

According to an aspect of some embodiments of the present invention there is provided a method 1100 of using a mechanical actuator 200 comprising the following steps:

1101 immobilize screw. For example, a locking mechanism on a motor as described above connected to the screw may prevent the screw from rotating.

1102 Rotationally Disengage nut from casing. For example, a bearing and/or auxiliary as described above may rotationally disengage the nut from the casing.

1103 Drive nut. For example, an auxiliary may be attached to the nut to provide rotational force to rotate the nut, as described above.

1104 Actuate bollard. For example, by driving the nut, the casing, for example a bollard, may be raised and/or lowered, as described above.

It is expected that during the life of a patent maturing from this application many relevant technologies will be developed and the scope of the term turf is intended to include all such new technologies a priori.

As used herein the term "about" and "substantially" refers to ±5 The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A mechanical actuator for raising and lowering comprising:
   a vertical screw;
   a nut threaded onto a vertical screw;
   a casing rotationally engaged with said nut, said casing prevented from rotating;
   a first torque source rotationally engaged to said screw and said casing for rotating said screw with respect to said casing while said nut is rotationally engaged to the casing thereby raising and lowering said nut;
   a brake for rotationally engaging said vertical screw to said casing;
   a bearing reversibly engageable between said casing and said nut for providing rotational disengagement between said casing and said nut; and
   a second torque source external to said casing configured for applying rotational force to said nut while said nut is rotationally disengaged from the casing and the screw is rotationally engaged to the casing thereby causing said nut to rotate on said screw, raising and lowering said nut.

2. The mechanical actuator of claim 1, wherein said first torque source includes a motor.

3. The mechanical actuator of claim 1, wherein said brake is configured to automatically engage in response to a malfunction of said first torque source.

4. The mechanical actuator of claim 1, wherein said second torque source is insertable into said casing.

5. The mechanical actuator of claim 1, said nut comprising a ball screw nut.

6. The mechanical actuator of claim 1, wherein said casing is vertically engaged to said nut for raising and lowering with said nut.

7. The mechanical actuator of claim 6, wherein said casing comprising a bollard.

8. The mechanical actuator of claim 6, wherein said casing is indirectly engaged with said nut by an intermediary piston, said nut fixedly attached to said piston, an internal downward surface of said casing resting on an external upward facing surface of said piston.

9. The mechanical actuator of claim 8, said casing comprising a conduit from said internal downward surface to an external upward facing surface, said conduit providing mechanical access of said torque source to said piston.

10. The mechanical actuator of claim 9, said bearing comprising proximal and distal portions rotationally separated by a rotatable mechanism, when said bearing inserted in said conduit said proximal portion mechanically engaging with said casing, and said distal portion resting on said piston, said bearing of a length greater than said conduit thereby lifting and rotationally disengaging said casing from said piston when inserted.

11. The mechanical actuator of claim 8, said bearing comprising a conduit providing vertical access to said intermediate piston.

12. The mechanical actuator of claim 11, further comprising an auxiliary, said auxiliary comprising at least one item chosen from a group comprising said bearing, a shank, and a handle, said shank reversibly insertable within said conduit and rotationally engageable with said intermediate piston, and said handle attachable to said shank to provide leverage for manually rotating said shank.

13. The mechanical actuator of claim 2, wherein said motor comprises a thermal management system, said motor operating with duty cycle greater than 50%.

14. The mechanical actuator of claim 8, comprising at least one magnetic body attached to said piston, sensors for detecting a vertical position of said at least one magnetic body, and a mechanism for receiving an output from said sensors and calculating a vertical position of said piston.

15. The mechanical actuator of claim 1, comprising seals preventing liquid and particulate to enter an internal portion of said mechanical actuator.

16. A system for rotational disengagement of a casing and a vertical actuator comprising:
 a bearing comprising an axially rotatable mechanism connecting between a distal portion and a proximal portion of said bearing;
 a hollow conduit through a complete axial length of said bearing,
 wherein said proximal portion of said bearing is reversibly attachable to a conduit in a head of the casing, the casing resting on the vertical actuator, said distal portion of the bearing extending within said casing and disengaging between said casing and said actuator, allowing independent axial rotation of said actuator and said casing.

17. The system of claim 16, wherein said vertical actuator comprises a ball screw nut.

18. The system of claim 16, further comprising a bollard connected to said casing.

19. A method of using a mechanical actuator comprising:
 threading a nut onto a vertically oriented screw;
 vertically and rotationally engaging said nut to a casing;
 preventing said screw from rotating;
 rotationally disengaging said nut from said casing with a bearing; and
 applying a rotational force to said nut, causing said nut to rotate on said screw, raising or lowering said nut and said casing according to a direction of said nut rotation.

20. The method of claim 19, said nut comprising a ball screw nut.

* * * * *